(No Model.)

G. A. ALLEN.
CISTERN.

No. 367,576. Patented Aug. 2, 1887.

WITNESSES:
Donn Twitchell.
C. Sedgwick.

INVENTOR:
G. A. Allen
BY Munn & Co.
ATTORNEYS.

UNITED STATES PATENT OFFICE.

GEORGE A. ALLEN, OF MADISON, NEW JERSEY.

CISTERN.

SPECIFICATION forming part of Letters Patent No. 367,576, dated August 2, 1887.

Application filed December 16, 1886. Serial No. 221,729. (No model.)

*To all whom it may concern:*

Be it known that I, GEORGE A. ALLEN, of Madison, in the county of Morris and State of New Jersey, have invented a new and Improved Cistern, of which the following is a full, clear, and exact description.

My invention relates to water cisterns or reservoirs, and has for its object to provide simple inexpensive devices to insure a discharge of water from a level below the surface of the water in the cistern and above the bottom of the cistern, thereby avoiding the passage of either surface scum or impurities or sedimentary deposits into the discharge-pipe, and insuring a supply of pure water from the cistern for household or manufacturing purposes.

The invention consists in certain novel features of construction and combinations of parts of the cistern, all as hereinafter fully described and claimed.

Reference is to be had to the accompanying drawings, forming a part of this specification, in which similar letters of reference indicate corresponding parts in both the figures.

Figure 1:
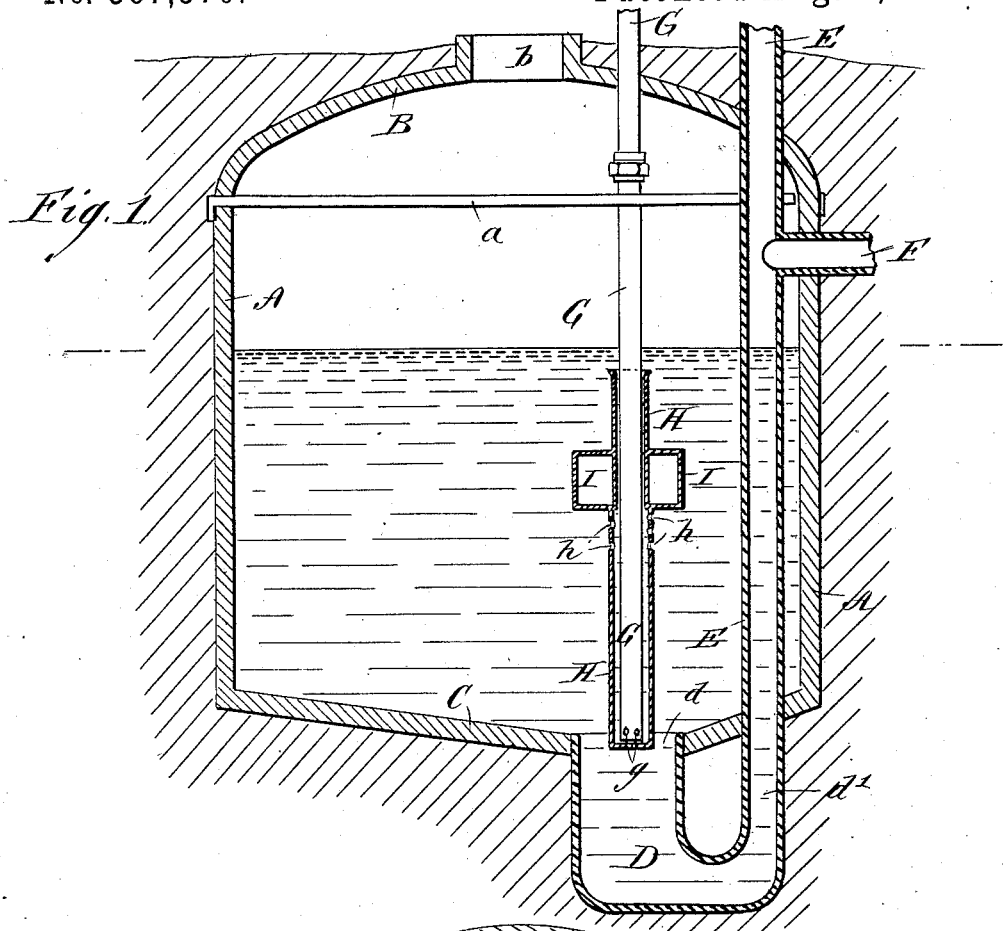
Figure 2:
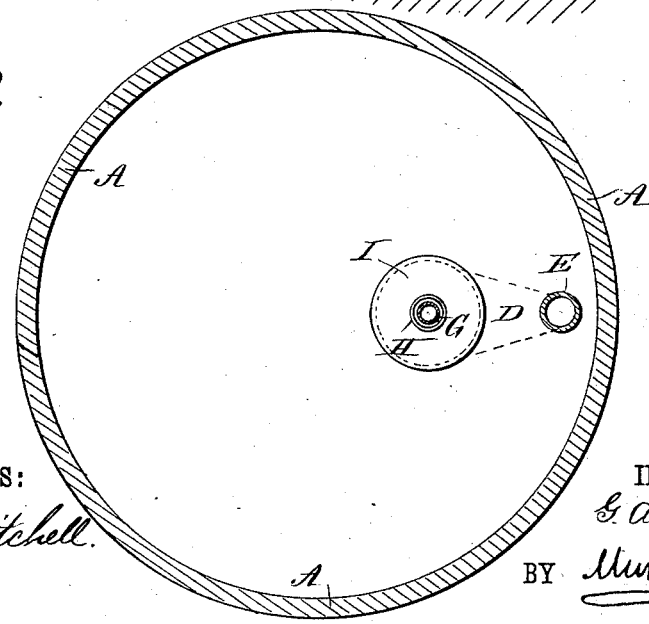

Figure 1 is a vertical sectional elevation of a cistern made in accordance with my invention; and Fig. 2 is a plan view in section on the line $x$ $x$, Fig. 1.

The side walls, A, of the cistern body are shown cylindrical in form, but they may be disposed to give a square, rectangular, oval, or other shape horizontally to the cistern. The cistern-top B has an opening, $b$, to receive a leader or other pipe to discharge into or supply the cistern with water from the roofs of buildings or other source. The bottom C of the cistern slopes from all sides toward the mouth $d$ of a trap or elbow, D, which is preferably made of glazed earthenware.

With the smaller upwardly-projecting part, $d'$, of the trap D there is connected the lower end of a pipe, E, which, as shown, ranges upward through the cistern; but this pipe may pass upward from the trap D outside of the cistern-body, if desired. A branch pipe, F, connects with the pipe E and serves as an overflow-pipe to conduct surplus water from the cistern to a ditch, or to any desired distant point. The open top of the pipe E serves as a vent to prevent siphoning out of the contents of the cistern through the overflow-pipe, and also provides for the insertion of a suction-pump, allowing all the sedimentary deposits in the trap D to be drawn off through the pipe E. should these trap deposits not flush off through the overflow as fast as may be desirable. A hook or other device may also be passed down through the pipe E into the trap D to remove therefrom any solid matters not easily drawn off through the suction-pump.

The discharge-pipe G, to which a pump will be connected at a convenient place for drawing the water from the cistern, will be fastened preferably in a cross bar or brace, $a$, fixed to the sides of the cistern, and the lower end or mouth of the pipe G will enter the mouth $d$ of the sediment-trap. Before the discharge-pipe G is fastened to place, I slip upon its lower part a pipe or tube, H, which may move freely up and down on the discharge-pipe. This tube H is closed at its lower end, and at its upper part it carries a float, I, which may have any approved construction and acts normally to hold the bottom of the tube H up to or toward the open lower end of the discharge-pipe. The tube H is preferably made larger in diameter below the float I, as shown in Fig. 1 of the drawings.

In the sides of the tube H, below the float I, are made a series of holes, $h$, for inlet of water from the cistern, and the combined area of these holes $h$ will equal or exceed the area of opening of the mouth of the discharge-pipe. To facilitate the passage of water through the pipe G from the tube H when the water-level is sufficiently high in the cistern to hold the closed bottom of the float-tube H up to the bottom of the discharge-pipe, the latter may have a series of side holes, $g$, near its lower end.

The operation of the improvement is very simple and effective, and as follows: When the water-level in the cistern stands at or above a point which will cause the float I to buoy up the tube H until its closed lower end strikes the bottom of the discharge-pipe, as in Fig. 1 of the drawings, the water-supply to the pipe G through the float-tube holes $h$ will be taken from the body of water in the cistern below its surface scum and impurities and above its sedimentary deposits; and I find in practice that should the water-level stand at or above the open upper end of the float-tube there will be no current downward through this tube. Consequently surface-scum will not be admitted to the discharge-pipe. When the discharge-pipe G is made of some smooth material which will not be deleterious to the water in the cistern, and has an even or gaged outside diameter, a packing may be fitted to the top of the tube H around the discharge-pipe.

As the water-level falls sufficiently to allow the float I and tube H to fall, the float will sink a few inches, and the supply through the holes $h$ will still be taken from the body of water between its surface impurities and sedimentary deposits. Consequently the water pumped from the pipe G will always be pure and sweet. It is obvious that the falling float-tube H may enter the trap D to a point allowing the tube-holes $h$ to stand about at the mouth of the trap D; hence all the water may be pumped from the body of the cistern, leaving impure water in the trap.

My improvements above described may be fitted to cisterns or reservoirs of any size, either above or under ground, and with like good results in securing a supply of comparatively pure water, which could not be obtained were the supply drawn either from the water-surface or from a point at or very near the bottom, as will readily be understood.

Having thus fully described my invention, what I claim as new, and desire to secure by Letters Patent, is—

1. In a cistern, the combination, with a discharge-pipe, of a slip-tube placed thereon, and said tube having a closed lower portion, and provided with water-inlet holes above said portion, and a float device connected to the slip-tube, substantially as described, for the purposes set forth.

2. In a cistern, the combination, with a discharge-pipe extending to or near the bottom of the cistern, of a slip-tube placed on said pipe and having a closed lower portion, and water-inlet holes above said portion, and a float device connected to the slip-tube, substantially as described, for the purposes set forth.

3. In a cistern, the combination, with a sediment-trap at the bottom of the cistern, of a discharge-pipe over the trap, a slip-tube placed on said pipe and having a closed lower portion, and water-inlet holes above said portion, and a float device connected to the slip-tube, substantially as shown and described, whereby the slip-tube may fall into the trap as the water-level lowers, to allow the cistern to be emptied, as set forth.

4. A cistern constructed with side walls, A, bottom C, a trap, D, into which the bottom may drain, and a pipe, E, connected to the trap and extending upward therefrom, substantially as shown and described, whereby the trap may be cleaned through the pipe E, as set forth.

5. A cistern constructed with side walls, A, bottom C, a trap, D, into which the bottom may drain, a pipe, E, connected to the trap and extending upward therefrom, and an overflow-pipe, F, connected to pipe E, substantially as shown and described.

6. A cistern constructed substantially as herein shown and described and comprising side walls, A, bottom C, a trap, D, into which the bottom may drain, a pipe, E, connected to the trap and extending upward therefrom, a discharge-pipe, G, arranged over the trap, a slip-tube, H, placed on the pipe G and having a closed lower portion, and water-inlet holes $h$ above said portion, and a float device, as I, connected to the tube H, all arranged for operation as and for the purposes set forth.

GEORGE A. ALLEN.

Witnesses:
HENRY L. GOODWIN,
EDGAR TATE.